(12) United States Patent
Pan (10) Patent No.: US 6,233,121 B1
(45) Date of Patent: May 15, 2001

(54) MAGNETIC DISK DRIVE SUSPENSION PITCH MOTION LIMITER

(75) Inventor: Tzong-Shii Pan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,473

(22) Filed: Apr. 9, 1999

(51) Int. Cl.[7] ........................................................ G11B 5/68
(52) U.S. Cl. ........................................................ 360/245.7
(58) Field of Search ................................ 360/244.2, 245, 360/245.3, 245.4, 245.5, 245.6, 245.7

(56) References Cited

U.S. PATENT DOCUMENTS

| 5,333,085 | 7/1994 | Prentice et al. | 360/104 |
|---|---|---|---|
| 5,570,249 | 10/1996 | Aoyagi et al. | 360/104 |
| 5,771,136 | 6/1998 | Girard | 360/104 |
| 5,815,349 | 9/1998 | Frater | 360/104 |

FOREIGN PATENT DOCUMENTS

| 64-062876 | 3/1989 | (JP) . |
|---|---|---|
| 6-060585 | 3/1994 | (JP) . |
| 7-078436 | 3/1995 | (JP) . |
| 7-211033 | 8/1995 | (JP) . |
| 10-069745 | 3/1998 | (JP) . |
| 10-255423 | 9/1998 | (JP) . |
| 97/21212 | 6/1997 | (WO) . |

OTHER PUBLICATIONS

"Head Suspension Assembly Deflection Limiter", IBM Technical Disclosure Bulletin, vol. 38, No. 07, Jul. 1995, pp. 531–532.
"Air Bearing", IBM Technical Disclosure Bulletin, vol. 13, No. 1, Jun. 1970, pp. 210.

Primary Examiner—George J. Letscher
(74) Attorney, Agent, or Firm—John H. Holcombe (57) ABSTRACT

A suspension assembly with a pitch motion limiter, for a magnetic disk drive. The suspension comprises a load beam having a load/unload cam follower at a distal end, and having a load gimbal; a flexure mounted on the load beam, the flexure having a free end adjacent the load gimbal, and the flexure having a gimbal surface facing the load gimbal and having a head slider mounting surface opposite the gimbal surface for mounting a head slider having a trailing edge; and a pitch limiter for limiting the maximum pitch motion of the flexure free end with respect to the load beam. The pitch limiter comprises a pair of tabs on the load beam at opposite sides of, and aligned with, the load gimbal, and the tabs projecting in a direction perpendicular to the head slider trailing edge, and a pair of frames on the flexure at opposite sides of the load gimbal, each of the frames aligned with and completely surrounding a corresponding one of the tabs. The frames are substantially parallel to the trailing edge of the head slider.

21 Claims, 8 Drawing Sheets

MAGNETIC DISK DRIVE SUSPENSION PITCH MOTION LIMITER

TECHNICAL FIELD

This invention relates to suspensions having flexures for mounting head sliders for magnetic disk drives, and, more particularly, to suspensions limiting the movement of a flexure and a mounted head slider with respect to the remainder of the suspension.

BACKGROUND OF THE INVENTION

Magnetic disk drives include at least one magnetic disk and at least one associated head slider for reading and/or writing data onto the magnetic disk. The head slider is mounted on a suspension which supports the head in a proper orientation with respect to the disk, and an actuator mechanism positions the head slider at desired radial positions or tracks of the disk.

Typically, the disk has a flat magnetic surface and is mounted on a spindle which is rotated by a spindle motor. The head slider is typically arranged to have an air bearing surface for flying the head slider closely adjacent the disk. The head slider flies on a film of air between the air bearing surface an the flat magnetic surface of the disk during rotation of the disk by the spindle motor. In order to establish the fly height of the head slider air bearing surface, the suspension typically provides a spring force against the head slider for loading the head slider against the film of air.

A typical suspension includes a load beam and a flexure. The load beam normally has an actuator mounting portion for mounting on the actuator, a loading region for mounting the flexure at the distal end of the load beam, and a spring region between the actuator mounting portion and the loading region for providing the loading force. The flexure may comprise an integrally connected extension from the load beam, or may comprise a separate element attached to the load beam. The flexure normally is welded to the load beam at one end, and the other end is a free end at which the head slider is mounted with the slider trailing edge away from the welds.

Typically, the load beam provides a load gimbal in the loading region adjacent the free end of the flexure, and the flexure has a gimbal surface facing the load gimbal. The head slider is mounted on the flexure at a head slider mounting surface opposite the gimbal surface. The flexure is typically a cantilever which is resilient in that it may tilt or twist with respect to the load beam, and the load gimbal and gimbal surface provide a pivot point about which the flexure and mounted head slider are permitted to pitch and roll so that the air bearing surface of the head slider may follow disk surface fluctuations. The gimbal often comprises a dimple in either the load gimbal or the gimbal surface which provides a point of contact with the other of the gimbal surface or the load gimbal. Alternatives comprise connecting bridges or supports which define axes of pitch and roll movements about the pivot point.

To prevent excessive movement of the head slider, shock limiters have been developed which limit the range of movement of the flexure. An example is shown in U.S. Pat. No. 5,771,136, Girard, issued Jun. 23, 1998. Girard shows two "L" shaped shock limiters on the load beam at the edge of the free end of the flexure to prevent excessive movement of the flexure, both shock limiters facing in the same direction. Alternatively, Girard shows a dual cantilever flexure with two "L" shaped shock limiters at one of the cantilevers and a "U" shaped shock limiter extending over the edge of the free end of the second cantilever, all to prevent excessive movement of the flexure. In another example, JP 778436, application JP 05224631, Ikeda et al., filed Sep. 9, 1993, shows two "L" shaped shock limiters at the front and back of a flexure, both facing the same direction. However, the shock limiters of both Girard and Ikeda et al. are open in several directions. In still another example, JP 10255423, application JP09360003, Miller, filed Dec. 12, 1997, shows shock limiter on a load beam. Limit elements at either side of the load beam cooperate with tabs on outer side arms which attach the flexure to the load beam. The tabs are perpendicular to the longitudinal direction and the limit elements may protect against excessive movement of the entire flexure and side arms.

As magnetic disk drives become miniaturized to a greater extent, the suspensions become increasingly delicate and less rigid in all directions. Further, it has become desirable to unload the head sliders from the disks when the disk drive is stopped. The unload is typically by means of a ramp which lifts the suspension away from the disk a slight amount as the actuator moves the suspension radially off the edge of the disk. As the disk drive is restarted, and the spindle motor rotates the disk up to speed, the actuator moves the suspension along the ramp toward the disk, engaging the head slider with the disk to form the air bearing.

The typical head slider is a "negative pressure" slider in which both a positive pressure air bearing and a negative pressure are generated between the head slider and the rotating disk. The pressures cause the head slider to fly at predetermined clearance from the rotating disk with a controlled pitch angle. The pitch angle allows the trailing edge of the slider, at which the head is located, to be held closest to the disk. The slider is thus constrained in pitch angle and fly height by the air bearing and negative pressure.

When the head slider is unloaded from the disk, the negative pressure constraining the head slider must be overcome. The negative pressure will generate a force as high as 3–4 grams, tending to separate the flexure from the gimbal and pitching the trailing edge down. This large negative pressure requires a long traveling distance for disengaging the slider and disk during the unloading process. Damage to the limiter and limiter disengagement are also possible under excessive negative pressure.

At the unloaded position, the suspensions are parked on the corresponding ramps. During a shock event, the head slider tends to pitch down, away from the welded load beam/flexure mount, and two head sliders on opposite sides of a disk may possibly collide with each other, causing permanent damage. Thus, in the prior art, a ramp shelf may be built into the ramp to prevent the pitch motion of the head slider and prevent slider collision. However, if there is limiter disengagement and the load beam jumps away from the ramp under high shock, the flexure may be permanently damaged.

SUMMARY OF THE INVENTION

It is an object of the present invention to limit the maximum pitch movement of a head slider during load/unload.

Disclosed are a suspension assembly and an associated magnetic disk drive, the suspension assembly supporting a head slider at a disk surface in the disk drive. The suspension comprises a load beam having a load/unload cam follower at a distal end thereof, and having a load gimbal; a flexure mounted on the load beam, the flexure having a free end adjacent the load gimbal, and the flexure having a gimbal surface facing the load gimbal and having a head slider mounting surface opposite the gimbal surface for mounting a head slider having a trailing edge, the trailing edge on the side of the slider facing away from the flexure/load beam mount; and a pitch limiter for limiting the maximum pitch motion of the flexure free end with respect to the load beam. The pitch limiter comprises a pair of tabs on the load beam at opposite sides of, and aligned with, the load gimbal, and the tabs facing in opposite directions, or in the same direction, substantially perpendicular to the head slider trailing edge, and a pair of frames on the flexure at opposite sides of the load gimbal, each of the frames aligned with and completely surrounding a corresponding one of the tabs.

In another aspect of the present invention, the limiter is formed by forming a pair of tabs on the load beam, the load beam having a load/unload cam follower at its distal end, the tabs at opposite sides of, and aligned with, the load gimbal, the tabs facing in opposite directions, or in the same direction, substantially perpendicular to the trailing edge of a head slider to be mounted on the flexure; by forming a pair of frames on the flexure at opposite sides of the load gimbal, each of the frames aligned with a corresponding one of the tabs and substantially parallel to the trailing edge of the head slider; and by bending at least a portion of the frames in a direction toward the load beam and away from the flexure head slider mounting surface so that each of the pair of frames completely surrounds a corresponding one of the tabs.

Thus, during a shock event, when the flexure with slider tends to separate from the load beam, the limiters, because of their alignment in accordance with the present invention will remain engaged, ensuring full protection of the head sliders and flexure under severe handling, loading, unloading, and shock events.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
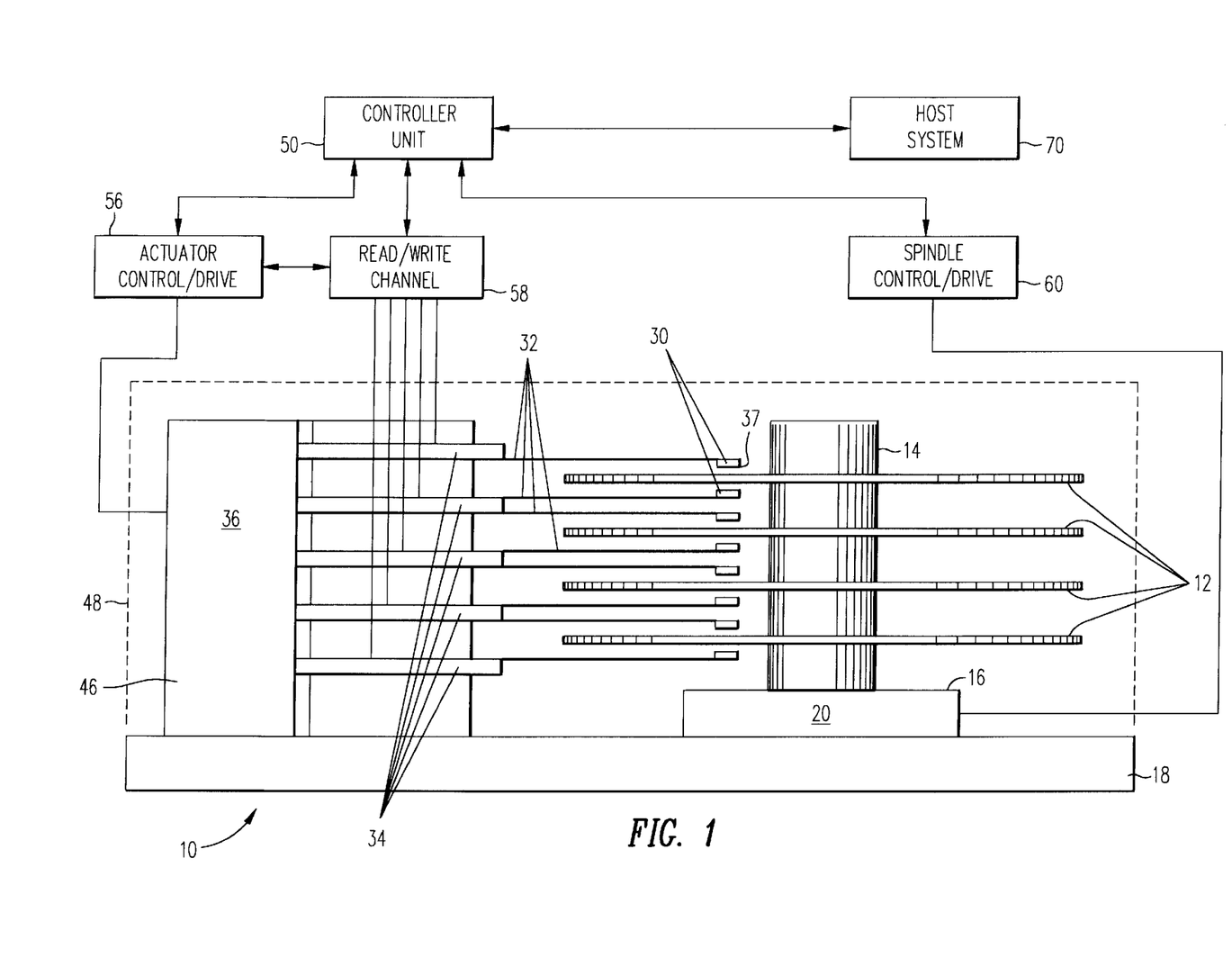
FIG. 1 is a schematic representation of a magnetic disk drive of the present invention.
Figure 2:
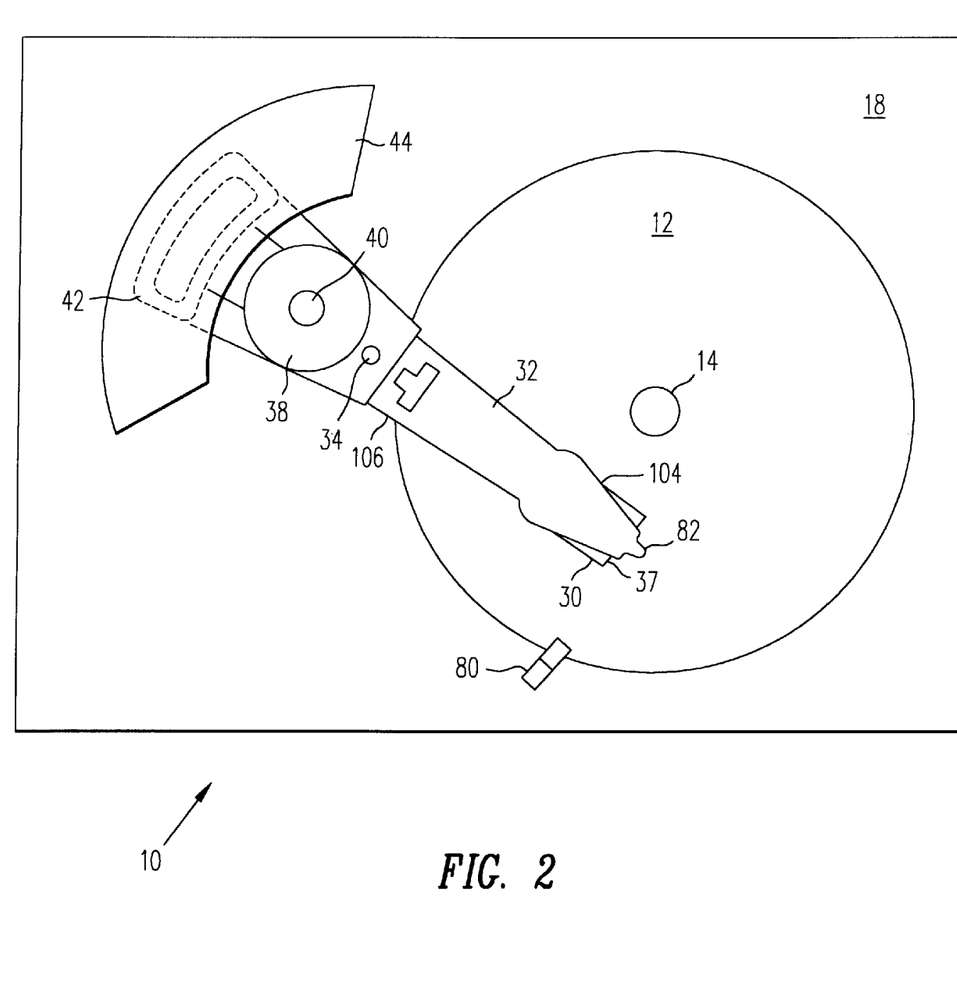
FIG. 2 is top view representation of the magnetic disk drive of FIG. 1.

Referring to FIGS. 1 and 2, an embodiment of a magnetic disk drive 10 is illustrated which comprises a plurality of magnetic disks 12. The disks 12 are mounted on a spindle 14 which is coupled to a spindle motor 16 which rotates the disks about a central axis. The spindle motor 16 is mounted to a chassis 18. The disks 12, spindle 14, and spindle motor 16 comprise a disk stack assembly 20.

A plurality of head sliders 30 are positioned over the disks 12 such that each surface of the disks 12 has a corresponding head slider 30. Each head slider 30 is mounted on one of a plurality of suspensions 32 which in turn are attached to a plurality of actuator arms 34 which are coupled to a rotary actuator 36. The head sliders each include at least one head at the trailing edge 37 of the head slider. As the spindle motor rotates the disks 12, the heads of the head sliders trace circular paths on the disks. Actuator 36 moves the head sliders 30 in a generally radial direction across the surface of the disks 12. An actuator 36 typically comprises a rotating member 38 mounted to a rotating bearing 40, an actuator "voice coil" motor winding 42 and "voice coil" magnets 44. The actuator is also mounted to the chassis 18. Although a rotary "voice coil" actuator is shown, a linear or other type of actuator may alternatively be used. The head sliders 30, suspensions 32, and actuator 36 comprise an actuator assembly 46. The disk stack assembly 20 and the actuator assembly 46 are typically sealed in an enclosure 48 (shown by a dashed line) which provides protection from particulate contamination.

A drive controller 50 provides overall control to the magnetic disk drive assembly 10. The drive controller 50 typically includes a processor, memory and other digital circuitry. The controller 50 is coupled to an actuator control/drive 56, which is coupled to and operates the actuator 36. The controller 50 thus may control the movement of the head sliders 30 over the disks 12, so that the head sliders trace concentric tracks across the disks. The controller 50 is coupled to a read/write channel 58 which in turn is connected to the heads of the head sliders 30. Thus, the controller 50 sends and receives data to and from the heads for recording on and retrieval from the disks 12. Controller 50 is also coupled to a spindle control/drive 60 which in turn is coupled to the spindle motor 16. This provides the operation of the spindle motor to rotate the disks 12. A host system 70, which typically is a computer processor, is coupled to the drive controller 50. The host system 70 may send commands to the controller 50 and may send digital data to the controller to be stored on the disks, or may request that digital data be read from the disks and sent to the host system.

The disk drive 10 includes a loading ramp 80 at the edge of the disk pack assembly 20. A load/unload cam follower 82 at the tip of the distal end of each of the suspensions 32 rides up the loading ramp 80 as the actuator 36 moves the head sliders 30 to the outer disk position, thereby unloading the head sliders from the disks 12. To unload a head slider means that it is moved a vertical distance away from its corresponding disk surface. Thus, as the actuator moves the suspension radially off the edge of the disk, the ramp 80 lifts the cam follower 82 and the suspension away from the disk 12 a slight amount. The rotation of the disk may then be stopped. As the disk drive is restarted, and the spindle motor rotates the disk up to speed, the actuator 36 moves the suspension cam follower 82 along the ramp toward the disk 12, engaging the head slider 30 with the disk 12 to form the air bearing.

The head sliders 30 are arranged to have an air bearing surface for flying the head slider closely adjacent to the flat magnetic surface of the associated disk 12 on a film of air between the air bearing surface and the flat magnetic surface during rotation of the disk by the spindle motor. In order to establish the fly height of the head slider air bearing surface, the suspension 32 provides a spring force against the head slider for loading the head slider against the film of air.

As discussed above, the "negative pressure" slider generates both a positive pressure air bearing and a negative pressure between the head slider and the rotating disk. The various pressures are intended to control the pitch of the head slider about a gimbal so that the leading edge of the slider flies at the greatest clearance from the disk and the trailing edge and the head are closest to the disk. During the unload process, or in the event of shock, the generated negative pressure will be as high as 3–4 grams. As the result, the flexure tends to separate from the gimbal and the trailing edge tends to pitch down, a motion not protected by existing shock limiters.

An embodiment of the suspension 32 in accordance with the present invention to limit pitch motion is illustrated in FIGS. 3A, 4A, 4B, 5B and 5C. The suspension includes a load beam 100 and a flexure 102. Referring to FIG. 2, the load beam 100 has an actuator mounting portion at arm 34 for mounting on the actuator 36, a loading region 104 for mounting the flexure at the distal end of the load beam, e.g., by welding at weld points 105, and a spring region 106 between the actuator mounting portion and the loading region for providing the loading force. The flexure 102 is illustrated as comprising a separate element attached to the load beam by mounting at weld points 105. The flexure is thus mounted to the load beam 100 at one end 110, and the other end 112 is a free end at which the head slider 30 is mounted.

The load beam 100 provides a load gimbal 120 in the loading region adjacent the flexure free end 112, and the flexure 102 has a gimbal surface 122 facing the load gimbal. The head slider 30 is mounted on the flexure 102 at a head slider mounting surface 124 opposite the gimbal surface. The flexure is a cantilever from the mount points 105 which is resilient in that it may tilt or twist with respect to the load beam, and the load gimbal 120 and gimbal surface 122 provide a pivot point about which the flexure and mounted head slider are permitted to pitch and roll so that the air bearing surface of the head slider may follow disk surface fluctuations. The gimbal is illustrated as a dimple in the load gimbal 120, but may alternatively be in the gimbal surface 122. The dimple thus provides a point of contact with the other of the gimbal surface or the load gimbal.

As discussed above, prior art shock limiters do not protect against excessive pitch motion. Further, as the result of the unload movement, or a shock received while the head is unloaded, the negative pressure may cause flexure to disengage from the prior art shock limiters through one of the many openings in the shock limiters. Thus, the flexure, while disengaged, may be forced into a position such that the unloaded head sliders may collide, or that the flexure will be forced away from the load beam, either causing permanent damage.

In accordance with the present invention, a pitch motion limiter of the suspension 32 limits the maximum pitch motion of the flexure free end 112 with respect to the load beam 100. The limiter comprises a pair of tabs 130 and 131 on the load beam 100 at opposite sides of, and aligned with, the load gimbal 120. The tabs project in a direction perpendicular to the trailing edge 37 of the head slider 30, facing in opposite directions. A pair of frames 136 and 137 are formed on the flexure 102 at opposite sides of the load gimbal, each of the frames aligned with and completely surrounding a corresponding one of the tabs.

As the result, with the flexure welded to the load beam 100 at weld points 105, the frames 136 and 137 capture the tabs 130 and 131 so that the flexure 102 is totally constrained by the frames and tabs preventing excessive pitch motion.

Figure 3A:
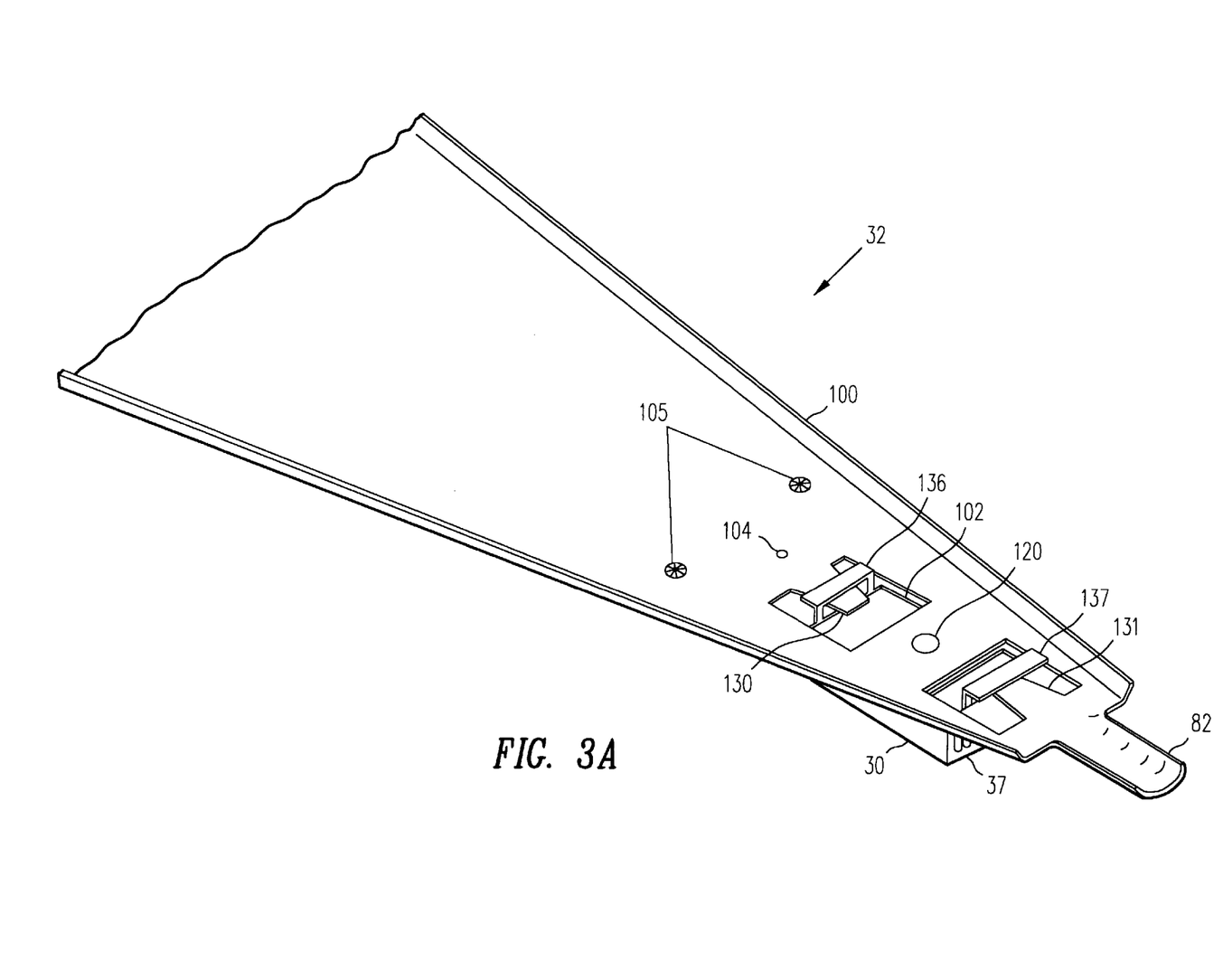
FIGS. 3A and 3B are perspective views of alternative embodiments of a suspension for the magnetic disk drive of FIGS. 1 and 2.
Figure 5A:
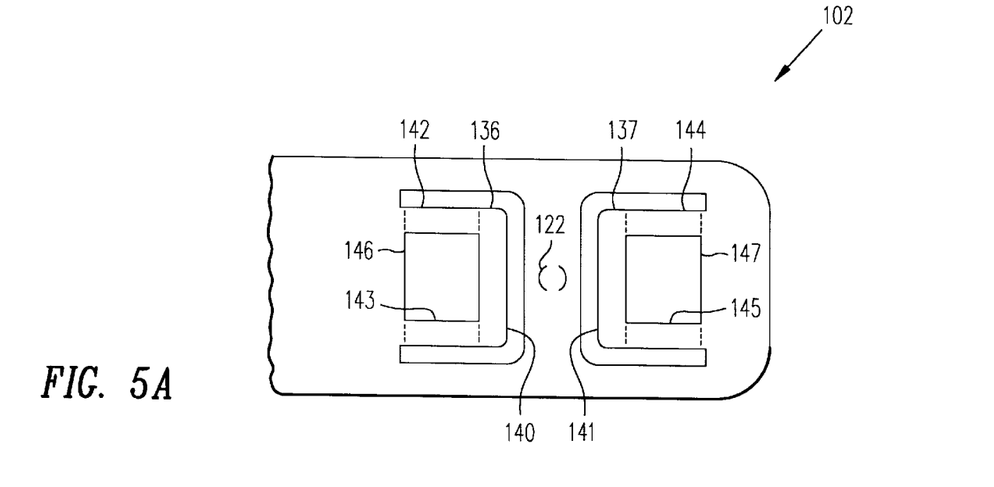
FIGS. 5A, 5B and 5C are schematic representations of the suspension of FIG. 3A, illustrating a method of forming the embodiment of FIG. 3A in accordance with the present invention.
Figure 5B:
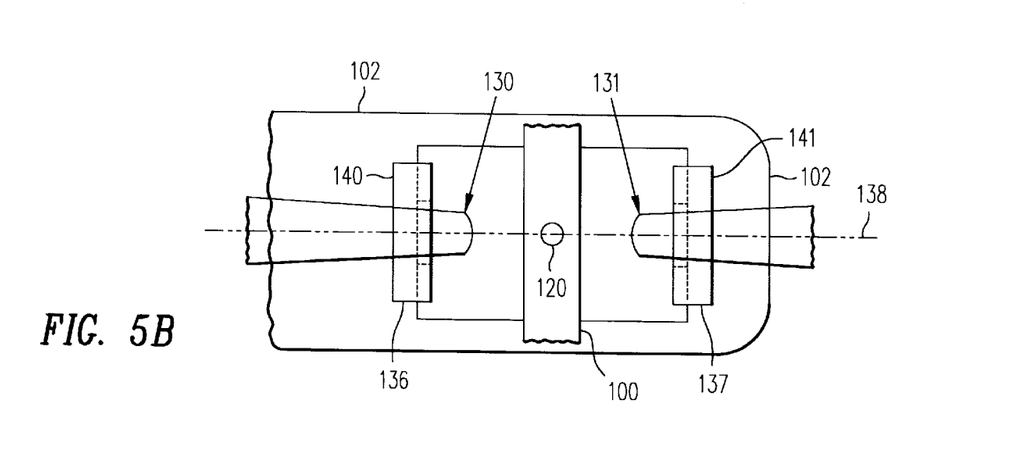
Figure 5C:
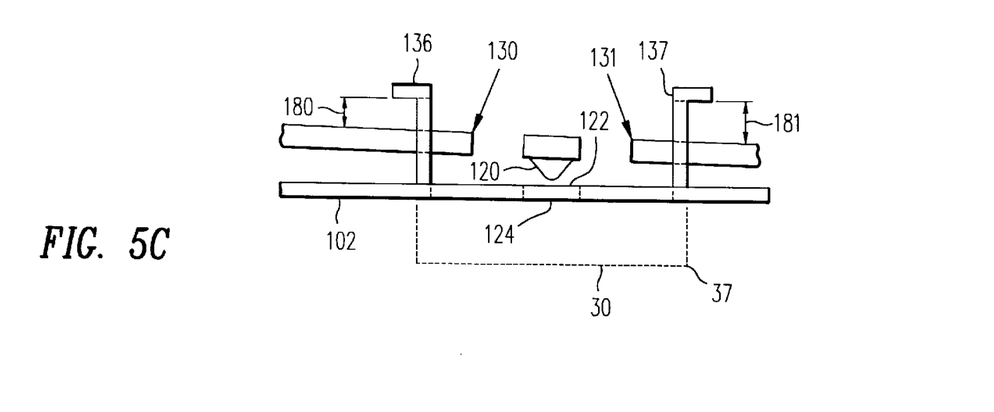

FIGS. 5A, 5B and 5C illustrate an embodiment of a method of forming the constraining structure of FIG. 3A. The pair of frames 136 and 137 are formed on the flexure 102 at opposite sides of the gimbal surface 122 along an axis 138 perpendicular to the trailing edge 37 of the head slider 30, which will be mounted to the head slider mounting surface 124. The frames are formed from the flexure 102, for example, by etching, while the flexure is flat. The flexure may comprise, for example, a laminated material including a stainless steel base with insulating and conducting layers for interconnecting the head slider 30 and the read/write channel 58. The frames are preferably formed from the stainless steel base only. The frames preferably each comprise a top bar 140 and 141, which is arranged to be substantially parallel to the trailing edge 37 of the head slider 30. The top bars 140 and 141 are integrally connected at each end to a side bar 142, 143 and 144, 145, and each side bar is integrally connected to the flexure 102. A base portion 146 and 147, coextensive with the flexure, completes the frame so as to form a continuous frame which will completely surround the tabs. The base portion is preferably also arranged so as to be aligned with the trailing edge 37 of the head slider 30.

So as to form the frames 136 and 137, the flexure is etched in patterns forming an inner and an outer "U" shape for each frame, thereby forming "U" shaped portions of the frames extending from said flexure.

The pair of tabs 130 and 131 are formed on the load beam 100 at opposite sides of the load gimbal 120, with the tabs facing in opposite directions, and aligned with the load gimbal along an axis 138 substantially perpendicular to the trailing edge 37 of head slider 30. The tabs are coextensive with the load beam 100, and may also be formed by etching.

The flexure 102 is welded to the load beam 100 at the distal end, with the gimbal surface 122 facing the load gimbal 120 and with each of the frames 136, 137 aligned with a corresponding one of the tabs 130, 131.

As illustrated in FIGS. 5B and 5C, at least a portion of each of the frames, comprising the "U" shaped portion of each frame, including top bars 140 and 141 and side bars 142, 143 and 144, 145, are then bent in a direction toward the load beam and away from the flexure head slider mounting surface 124 so that each of the pair of frames 136, 137 completely surrounds a corresponding one of the tabs 130, 131. The top bars 140 and 141 may also be bent over as illustrated to form a flat surface with respect to the tabs.

Thus, each of the frames is formed into a raised portion integrally connected to the flexure, and preferably orthogonal to the flexure. Each of the frames is therefore substantially orthogonal to the facing direction of the corresponding tab. Hence, the frames 136 and 137 capture the tabs 130 and 131 so that the flexure 102 is totally constrained by the frames and tabs, preventing excessive pitch motion of the flexure.

Figure 6A:
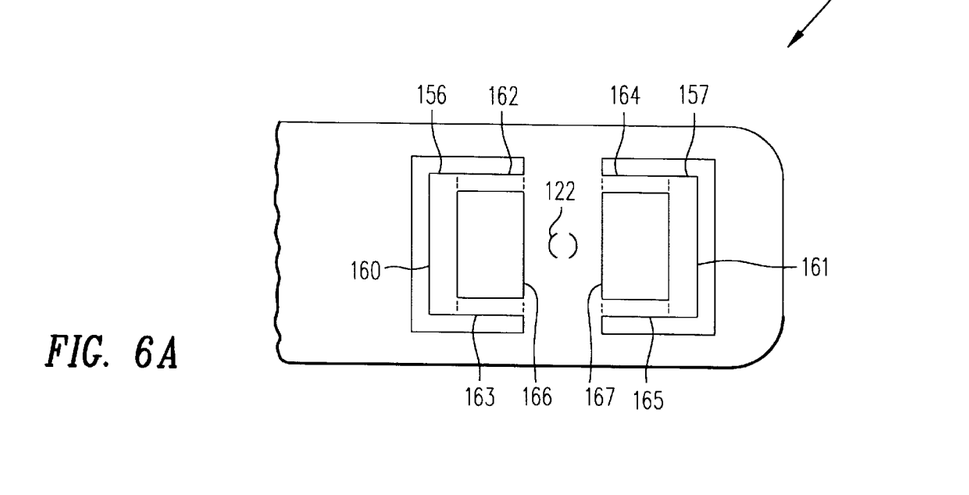
FIGS. 6A, 6B and 6C are schematic representations of an alternative embodiment of a suspension in accordance with the invention, and illustrating the method of forming the suspension.
Figure 6B:
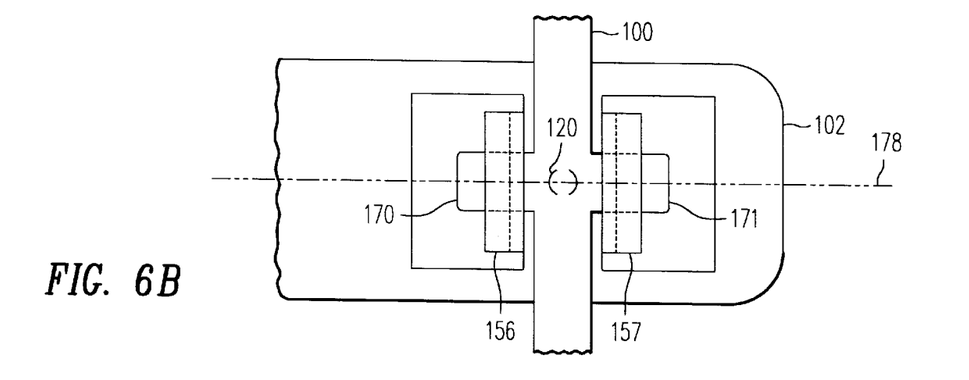
Figure 6C:
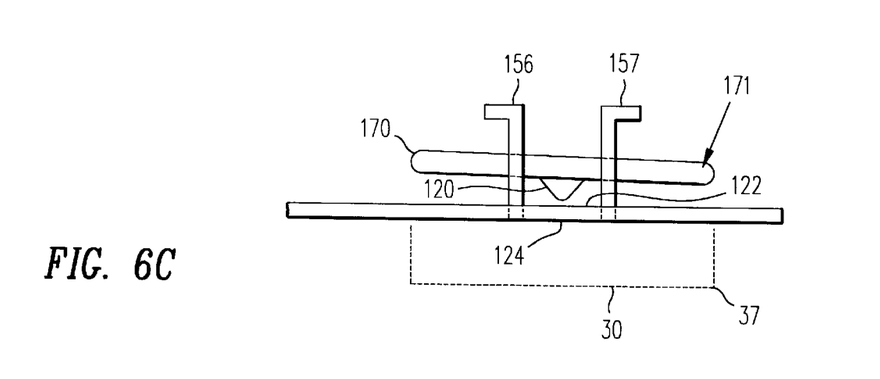

FIGS. 6A, 6B and 6C illustrate an alternative embodiment of a suspension in accordance with the invention, and illustrate the method of forming the suspension.

A pair of frames 156 and 157 are formed on the flexure 102 at opposite sides of the gimbal surface 122, facing away from each other. The frames are formed from the flexure 102, for example, by etching into a "U" shape, while the flexure is flat. The frames preferably each comprise a top bar 160 and 161, which is arranged to be substantially parallel to the trailing edge 37 of the head slider 30. The top bars 160 and 161 are integrally connected at each end to a side bar 162, 163 and 164, 165, and each side bar is integrally connected to the flexure 102. A base portion 166 and 167, coextensive with the flexure, completes the frame so as to form a continuous frame which will completely surround the tabs. The base portion is preferably also arranged so as to be aligned with the trailing edge 37 of the head slider 30.

A pair of tabs 170 and 171 are formed on the load beam 100 at opposite sides of the load gimbal 120, with the tabs facing outwardly in opposite directions, and aligned with the load gimbal along an axis 178 which is substantially perpendicular to the trailing edge 37 of head slider 30. The tabs are coextensive with the load beam 100, and may also be formed by etching.

The flexure 102 is welded to the load beam 100 at the distal end, with the gimbal surface 122 facing the load gimbal 120 and with each of the frames 156, 157 aligned with a corresponding one of the tabs 130, 131.

As illustrated in FIGS. 6B and 6C, at least a portion of each of the frames, comprising the "U" shape top bars 160 and 161 and side bars 162, 163 and 164, 165, are bent in a direction toward the load beam and away from the flexure head slider mounting surface 124 so that each of the pair of frames 156, 157 completely surrounds a corresponding one of the tabs 170, 171.

Thus, each of the frames is formed into a raised portion integrally connected to the flexure, and preferably orthogonal to the flexure. Each of the frames is thus substantially orthogonal to the facing direction of the corresponding tab. Hence, the frames 156 and 157 capture the tabs 170 and 171 so that the flexure 102 is totally constrained by the frames and tabs, preventing excessive pitch motion of the flexure.

Again, the tabs 170, 171 may alternatively be formed at the flexure 102, and the frames 156, 157 formed at the load beam 100.

Figure 3B:
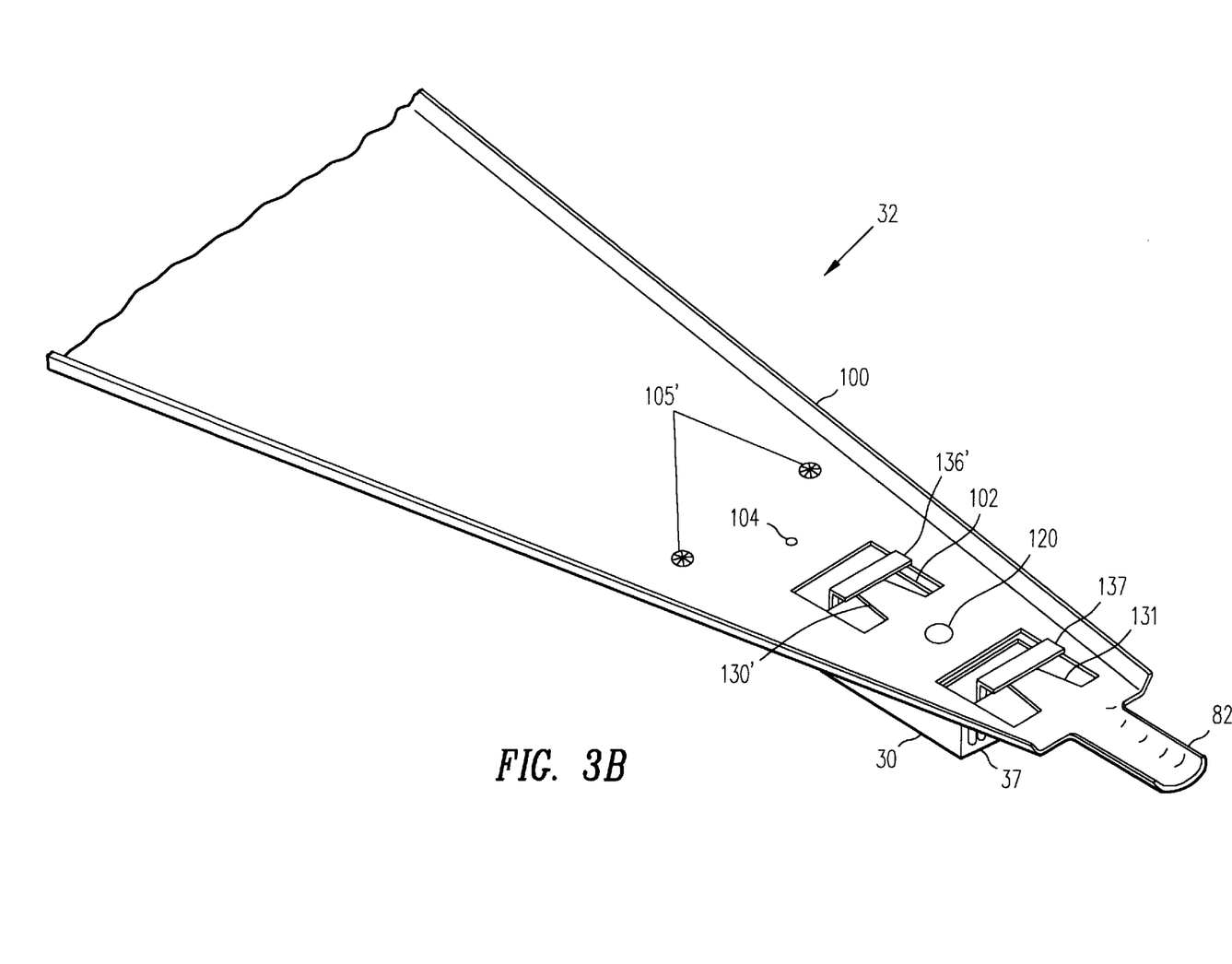
Figure 4A:
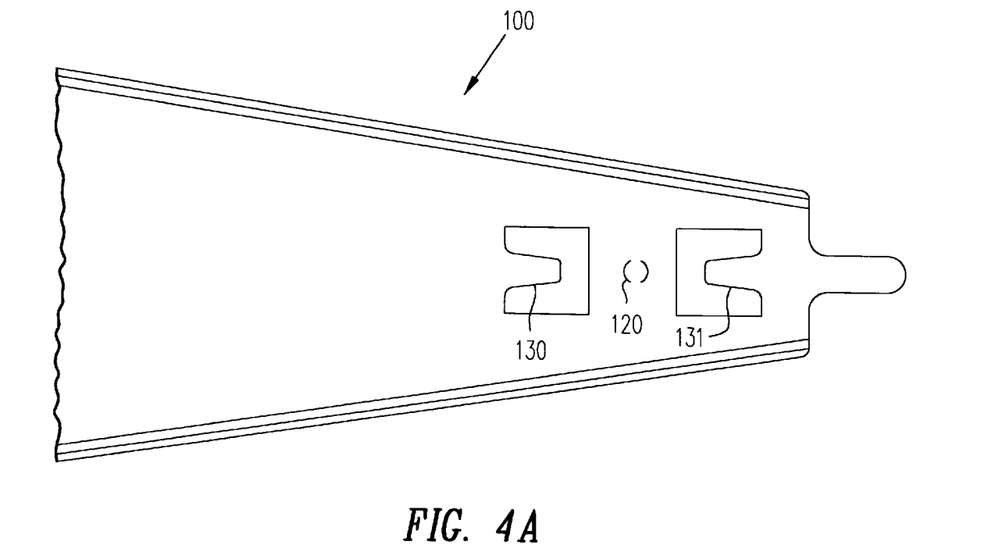
FIGS. 4A and 4B are top views, respectively, of a portion of the load beam and of the flexure of the embodiment of the suspension of FIG. 3A.
Figure 4B:
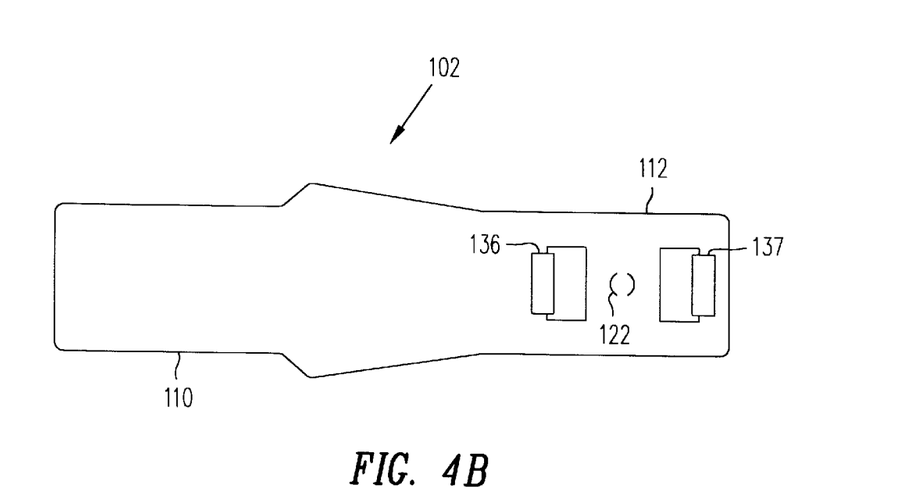
Figure 7A:
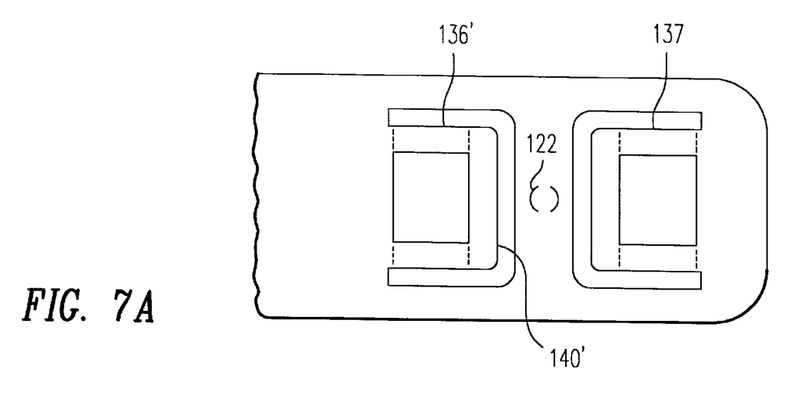
FIGS. 7A, 7B, and 7C are schematic representations of the suspension of FIG. 3B, illustrating a method of forming the embodiment of FIG. 3B in accordance with the present invention.
Figure 7B:
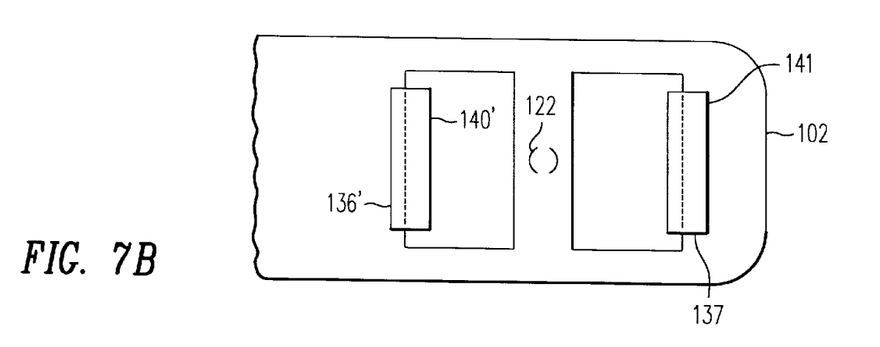
Figure 7C:
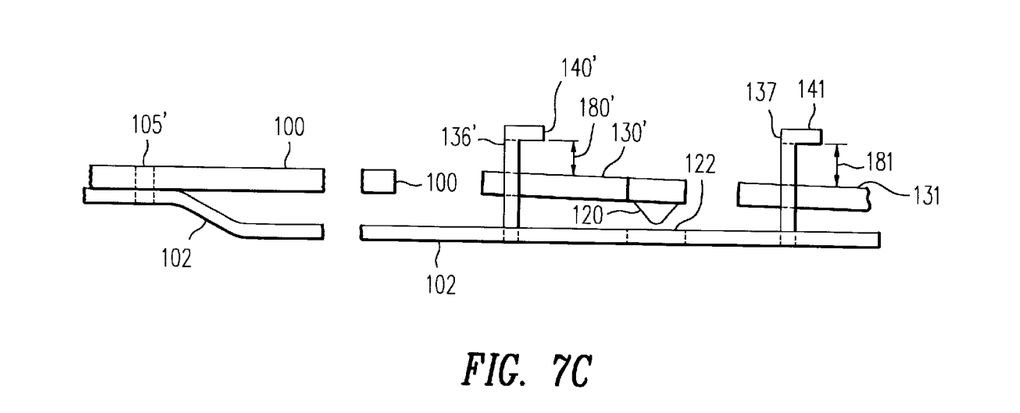

A further alternative embodiment of the suspension of the present invention is illustrated in FIGS. 3B and 7C, and an embodiment of a method for forming the structure is illustrated in FIGS. 7A, 7B and 7C. The difference between the embodiment of FIG. 3B and the embodiment of FIG. 3A is that tab 130' of FIG. 3B faces in the same direction as tab 131. To accommodate tab 130', top bar 140' of frame 136' is bent in the same direction as top bar 141 of frame 137. The differences between the method of FIGS. 7A, 7B and 7C and that of FIGS. 5A, and 5B and 5C are that frames 136' and 137 are bent prior to attaching the flexure 102 to the load beam 100. The tabs 130' and 131 are inserted into the respective frames 136' and 137, and then flexure 102 is welded to the load beam 100 at weld points 105'.

The flexure and load beam are welded at the leading edge side of the slider 30. Thus, during a shock or impact event, the flexure 102 and head slider 30 tend to separate from the load gimbal 120 of the load beam, causing the flexure to pitch down from the weld points 105'. This pitch causes the limiter tabs 130' and 131 to increasingly engage frames 136' and 137 and to prevent the possible disengagement of the prior art.

Referring to FIGS. 5C and 7C, the pitch limiter comprising tab 130 and frame 136 in FIG. 3A and 130' and frame 136' in FIG. 3B, which are at the leading edge side of slider 30, have a smaller gap 180 and 180' than gap 181 between tab 131 and frame 137. This insures that frames 136 or 136' engage first during the unloading process, so as to tilt the head slider 30 to minimize a "peeling zone" to break the negative pressure and to lift the head slider in the unload process.

While the preferred embodiments of the present invention have been illustrated in detail, it should be apparent that modifications and adaptations to those embodiments may occur to one skilled in the art without departing from the scope of the present invention as set forth in the following claims.

I claim:

1. A suspension assembly for supporting a head slider, said head slider having a trailing edge, at a disk surface in a disk drive for preventing excessive pitch motion of said head slider, comprising:

a load beam having a load/unload cam follower at a distal end thereof, and having a load gimbal;

a flexure mounted on said load beam, and having a free end, said flexure free end adjacent said load gimbal, said flexure having a gimbal surface facing said load gimbal and having a head slider mounting surface opposite said gimbal surface for mounting said head slider; and a pitch limiter for limiting the maximum pitch motion of said flexure free end with respect to said load beam, comprising a pair of tabs on said load beam at opposite sides of, and aligned with, said load gimbal and said tabs projecting along an axis substantially perpendicular to said trailing edge of said head slider, and a pair of frames on said flexure at opposite sides of said load gimbal, at least one of said frames comprising a base frame portion each of said frames aligned with and completely surrounding a corresponding one of said tabs, and said frames and said base portion substantially parallel to said trailing edge of said head slider.

2. The suspension assembly of claim 1, wherein at least one of said pair of frames is formed from said flexure.

3. The suspension assembly of claim 1, wherein at least a raised portion of each of said pair of frames is integrally connected by a bend to said flexure.

4. The suspension assembly of claim 3, wherein said pitch limiter raised portion of at least one of said frames comprises a top bar substantially parallel to said head slider trailing edge, said top bar integrally connected at each end thereof to a side bar, said side bars each integrally connected to said flexure.

5. The suspension assembly of claim 4, wherein said base frame portion is coextensive with said flexure, to which said raised portion of said frame is integrally connected.

6. The suspension assembly of claim 5, wherein said frame raised portion extends from said interconnected said flexure in a direction away from said head slider, and substantially orthogonal to said flexure.

7. The suspension assembly of claim 6, wherein a gap between said pitch limiter tab and corresponding frame top bar on the side of said load gimbal opposite said head slider trailing edge is less than a gap between said tab and corresponding frame top bar on the side of said load gimbal toward said head slider trailing edge.

8. The suspension assembly of claim 1, wherein said pitch limiter tabs on said load beam projecting along said axis, additionally face in opposite directions.

9. The suspension assembly of claim 1, wherein said pitch limiter tabs on said load beam projecting along said axis, additionally face in the same direction.

10. A magnetic disk drive, comprising:
- at least one disk, said disk having at least one flat magnetic surface;
- a motor for rotating said disk;
- at least one head slider having an air bearing surface for flying said head slider closely adjacent to said at least one flat magnetic surface of said at least one disk on a film of air between said head slider air bearing surface and said flat magnetic surface during rotation of said disk by said motor, said head slider having a trailing edge;
- an actuator for moving said head slider generally radially of said disk;
- a loading ramp adjacent an edge of said disk; and
- a suspension assembly mounted on said actuator for mounting said head slider and for loading said head slider against said film of air, comprising:
  - a load beam having a load/unload cam follower at a distal end thereof, said load/unload cam follower for riding against said loading ramp for unloading said head slider from said disk, said load beam having a load gimbal;
  - a flexure mounted on said load beam, and having a free end, said flexure free end adjacent said load gimbal, said flexure having a cross member having a gimbal surface facing said load gimbal and having a head slider mounting surface opposite said gimbal surface, said head slider mounted on said flexure at said head slider mounting surface; and
  - a pitch limiter for limiting the maximum pitch motion of said flexure free end with respect to said load beam, comprising a pair of tabs on said load beam at opposite sides of, and aligned with, said load gimbal and said tabs projecting along an axis substantially perpendicular to said trailing edge of said head slider, and a pair of frames on said flexure at opposite sides of said load gimbal, at least one of said frames comprising a base frame portion each of said frames aligned with and completely surrounding a corresponding one of said tabs, and said frames and said base portion substantially parallel to said trailing edge of said head slider.

11. The magnetic disk drive of claim 10, wherein at least one of said pair of frames is formed from said flexure.

12. The magnetic disk drive of claim 10, wherein at least a raised portion of each of said pair of frames is integrally connected by a bend to said flexure.

13. The magnetic disk drive of claim 12, wherein said suspension assembly pitch limiter raised portion of at least one of said frames comprises a top bar substantially parallel to said head slider trailing edge, said top bar integrally connected at each end thereof to a side bar, said side bars each integrally connected to said flexure.

14. The magnetic disk drive of claim 13, wherein said base frame portion is coextensive with said flexure, to which said raised portion of said frame is integrally connected.

15. The magnetic disk drive of claim 14, wherein said frame raised portion extends from said interconnected said flexure in a direction away from said head slider, and substantially orthogonal to said flexure.

16. The magnetic disk drive of claim 15, wherein a gap between said pitch limiter tab and corresponding frame top bar on the side of said load gimbal opposite said head slider trailing edge is less than a gap between said tab and corresponding frame top bar on the side of said load gimbal toward said head slider trailing edge.

17. The magnetic disk drive of claim 10, wherein said pitch limiter tabs on said load beam projecting along said axis, additionally face in opposite directions.

18. The magnetic disk drive of claim 10, wherein said pitch limiter tabs on said load beam projecting along said axis, additionally face in the same direction.

19. A method for forming a pitch limiter for a magnetic disk drive suspension, said suspension having a load beam with a load/unload cam follower at a distal end thereof, and having a load gimbal; and said suspension having a flexure mounted on said load beam, and having a free end, said flexure free end adjacent said load gimbal, said flexure having a gimbal surface facing said load gimbal and having a head slider mounting surface opposite said gimbal surface for mounting a head slider, said head slider having a trailing edge; said limiter for limiting the maximum pitch motion of said suspension flexure free end with respect to said load beam, comprising the steps of:
- forming a pair of tabs on said load beam at opposite sides of, and aligned with, said load gimbal, said tabs facing in opposite directions along an axis substantially perpendicular to said trailing edge of said head slider;
- forming a pair of frames on said flexure at opposite sides of said gimbal surface; at least one of said frames comprising a base frame portion,
- aligning each of said frames with a corresponding one of said tabs and substantially parallel to said trailing edge of said head slider; and
- bending at least a portion of said frames in a direction toward said load beam and away from said flexure head slider mounting surface so that each of said pair of frames completely surrounds a corresponding one of said tabs.

20. The method of claim 19, wherein said step of forming a pair of frames comprises etching said flexure in patterns forming an inner and an outer "U" shape for each said frame, thereby forming "U" shaped portions of said frames extending from said flexure, whereby said bending step bends said "U" shaped portion of each said frame.

21. A method for forming a pitch limiter for a magnetic disk drive suspension, said suspension having a load beam with a load/unload cam follower at a distal end thereof, and having a load gimbal; and said suspension having a flexure mounted on said load beam, and having a free end, said flexure free end adjacent said load gimbal, said flexure having a gimbal surface facing said load gimbal and having a head slider mounting surface opposite said gimbal surface for mounting a head slider, said head slider having a trailing edge; said limiter for limiting the maximum pitch motion of said suspension flexure free end with respect to said load beam, comprising the steps of:
- forming a pair of tabs on said load beam at opposite sides of, and aligned with, said load gimbal, said tabs facing in the same direction along an axis substantially perpendicular to said trailing edge of said head slider;
- forming a pair of frames on said flexure at opposite sides of said gimbal surface; at least one of said frames comprising a base frame portion,
- bending at least a portion of said frames in a direction toward said load beam and away from said flexure head slider mounting surface;
- inserting each of said tabs into a corresponding one of said frames, such that each of said pair of frames completely surrounds said corresponding tab, and is aligned substantially parallel to said trailing edge of said head slider; and
- mounting said flexure on said load beam at the end of said flexure opposite said free end.

* * * * *